United States Patent

[11] 3,550,609

[72] Inventor Jean A. Roche
 Reading, Ohio
[21] Appl. No. 824,983
[22] Filed May 15, 1969
[45] Patented Dec. 29, 1970
[73] Assignee General Electric Company
 a corporation of New York

[54] TEMPERATURE COMPENSATING RECEIVER FOR USE WITH A BOURDON TUBE FLUIDIC TRANSDUCER
 10 Claims, 5 Drawing Figs.
[52] U.S. Cl...................................................... 137/83,
 73/393, 73/411
[51] Int. Cl........................................................ F15f 5/00,
 G05d 16/00
[50] Field of Search........................................... 137/83, 85;
 91/3; 73/393, 411, (Inquired), 236

[56] References Cited
UNITED STATES PATENTS
2,356,970 8/1944 Brockett........................ 137/85UX
2,667,886 2/1954 Brewster........................ 137/85X Primary Examiner—A. Cohan
Attorneys—Paul A. Frank, Richard R. Brainard, John F. Ahern, Louis A. Moucha, Frank L. Neuhauser, Oscar B. Waddell and Joseph B. Forman ABSTRACT: A C-type Bourdon tube which responds to pressure changes in a sensed fluid is used to selectively deflect a jet of working fluid between the ports of a proportional fluidic receiver. The proportional fluidic receiver is carried by a bimetallic support member which imparts thereto temperature-related deflection of magnitude and direction sufficient to compensate for that portion of the Bourdon tube deflection which is due to the temperature modification of its structural resilience.

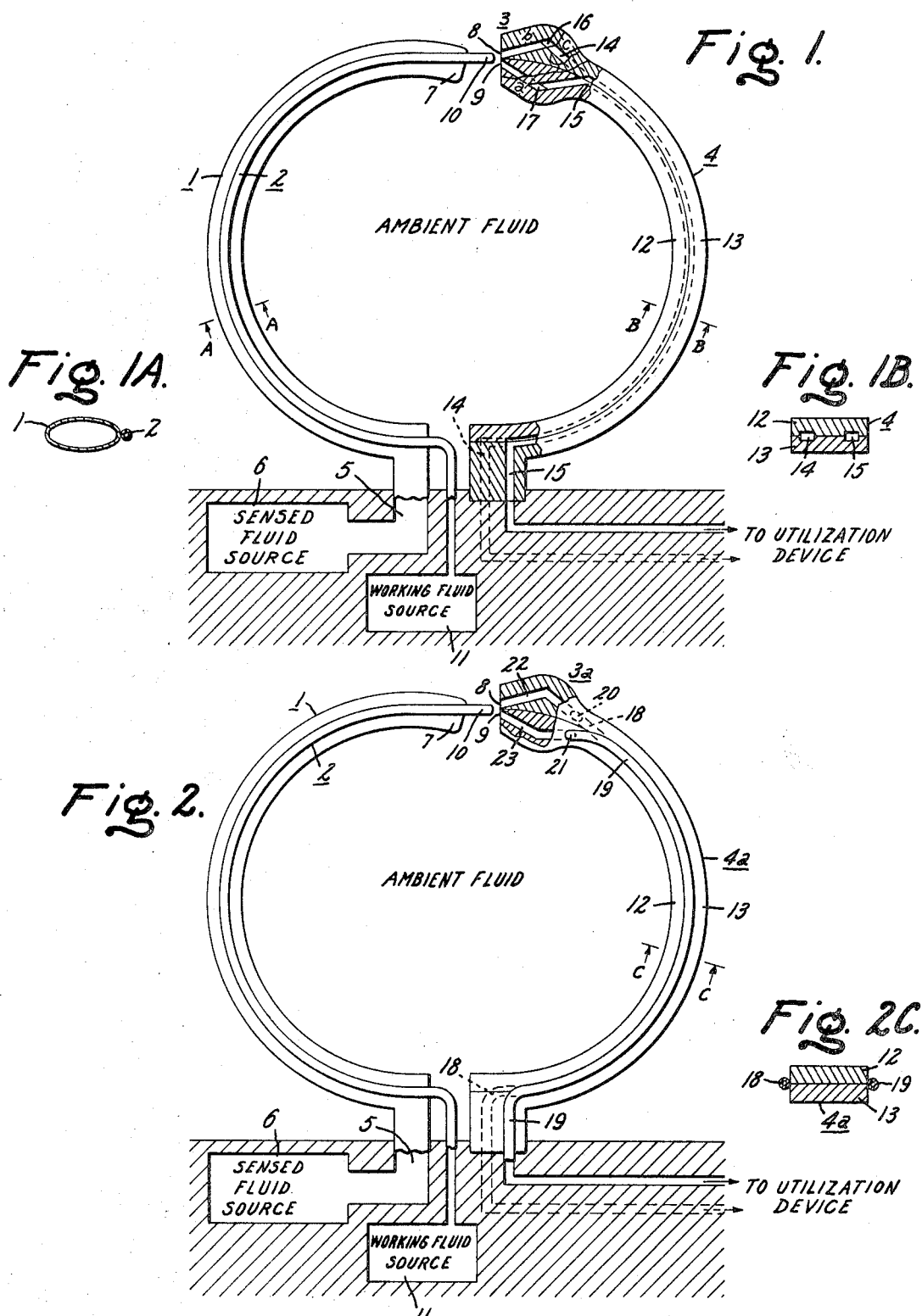

TEMPERATURE COMPENSATING RECEIVER FOR USE WITH A BOURDON TUBE FLUIDIC TRANSDUCER

This invention relates to fluid-operated pressure transducers, and more particularly, to fluid-operated pressure transducers which are compensated for temperature independent operation.

In the process control field it is frequently necessary to detect pressure changes in a fluid being processed and to translate these pressure changes into differential fluid signals suitable for incorporation as an input to standard fluidic circuit elements. Where the fluid being sensed is corrosive, or contains impurities, or resides at a relatively high temperature, it is necessary to maintain the sensed fluid in a state of segregation with respect to the working fluid used by the various fluidic components.

Pressure changes occurring in sensed fluids are generally measured in relation to some known, relatively stable, pressure standard. This pressure standard may be provided by either the atmosphere, a vacuum, or a fluid maintained at a known pressure level. Since pressures within the particular fluid system are measured with respect to the standard pressure, the latter may be viewed as the fluid analogue of "ground potential" in an electrical system. Accordingly, sensed signals supplied to a pressure transducer normally take the form of "single-sided" inputs rather than differential or "push-pull" inputs, and transducer reaction is related to the difference between the pressure of the sensed fluid and that of the standard. Because many fluidic devices such as proportional amplifiers, require differential rather than single-sided input signals, a transducer is required which is capable of receiving as an input, single-sided pressure signals from a sensed fluid and translating these into directly related differential pressure signals in a second dissimilar fluid, while providing isolation between the two fluids. A fluid-operated transducer capable of achieving these ends is described in the concurrently filed, copending application of J. N. Shinn, Ser. No. 824,984, filed May 15, 1969 entitled "Bourdon Tube Fluidic Transducer" and assigned to the assignee of the present invention, wherein, as one embodiment of that invention, a Bourdon pressure tube is provided which has a stationary open end in fluid communication with a sensed fluid, a deflectable closed end which moves in accord with pressure changes in the sensed fluid, and a nozzle which receives a working fluid through a flexible tubular member and directs the flow thereof into a proportional-type fluidic receiver in response to the deflection of the movable closed end of the Bourdon pressure tube.

The Bourdon tube fluidic transducer described in the above-named copending application has been found to operate satisfactorily in normal commercial application where temperatures are typically within the range of 60° F. to 125° F. However, in high temperature applications, such as jet engine control, where ambient temperatures in excess of 1000° F. are common, temperature compensation becomes a critical necessity. As ambient temperature increases, the molecular, and thus gross, resilience (stiffness) of the Bourdon tube decreases, i.e., the material of the Bourdon tube becomes "softer." Accordingly, for a given incremental increase in internal pressure of the Bourdon tube, deflection of the movable closed end thereof will be greater at higher temperature than at lower temperatures. A C-type steel Bourdon tube whose movable closed end deflects one unit of length for a unit change in internal pressure at room temperature might be expected, at 1000° F., to deflect the same amount in response to an internal pressure change of only two-thirds of a unit. Proper operation of the Bourdon tube fluidic transducer requires that the working fluid nozzle connected to the movable closed end of the Bourdon tube move in relation to the ports of the fluidic receiver as a function of pressure only. Any misalignment of the working fluid nozzle with the fluidic receiver which is attributable to temperature rather than pressure variations will result in a fluidic output signal which is no longer directly related to the relative pressure of the sensed fluid but which represents a composite indication of relative pressure and ambient temperature.

In accord with the present invention, this prior art problem has been overcome by mounting the fluidic receiver at the movable end of a properly designed bimetallic support member, whereby temperature-related movement is imparted to the receiver in a direction and to an extent which will compensate for the changes in Bourdon tube resilience and the associated error superimposed upon the otherwise pressure-determined position of the working fluid nozzle.

Accordingly, it is the primary object of this invention to provide a temperature compensating fluidic receiver which will render a Bourdon tube fluidic transducer substantially temperature independent.

Briefly stated, and in accord with one aspect of the invention, a proportional fluidic receiver is provided at the movable end of a C-shaped bimetallic support member. A C-type Bourdon tube which is responsive to pressure changes in a sensed fluid is used to impart pressure-related motion to a fluid jet issuing from a nozzle which is in fluid communication, via a flexible tubular member, with a source of working fluid. The ports of the fluidic receiver are in fluid communication with an appropriate utilization device via passages formed in the bimetallic support member. The jet of working fluid impinges upon the ports of the proportional fluidic receiver in relation to the relative positions of the movable closed end of the Bourdon tube and the movable end of the bimetallic support member. As variations in ambient temperature cause the resilience (and therefore deflection) of the Bourdon tube to change, the bimetallic support member bends to compensate for the tendency of misalignment of the fluid jet and fluidic receiver due to this temperature-related deflection.

The invention is pointed out with particularity in the appended claims. However, other objects and advantages, together with the operation of the invention, may be better understood by reference to the following detailed description taken in conjunction with the following illustrations wherein:

FIG. 1 represents a first and preferred embodiment of the invention wherein a bimetallic support member having internal fluid passages imparts temperature-related motion to a proportional fluidic receiver to compensate for any deflection of the opposing Bourdon tube which is due to temperature rather than pressure variations.

FIG. 1A represents a sectional view taken on line A-A in FIG. 1.

FIG. 1B represents a sectional view taken on line B-B in FIG. 1.

FIG. 2 represents a second embodiment of the invention wherein the ports of the proportional fluidic receiver are in fluid communication with a utilization device via externally mounted flexible tubular members.

FIG. 2C represents a sectional view taken on line C-C in FIG. 2.

Referring now to the preferred embodiment of the invention shown in FIG. 1, it is seen that there are four basic components: a C-type Bourdon tube 1, a flexible tubular member 2, a proportional fluidic receiver 3, and a C-shaped bimetallic support member 4.

The Bourdon tube 1 is of the standard C-type. It is surrounded by an ambient fluid, which is assumed to be air at atmospheric pressure, and has a curved portion and a noncircular cross section. The flexible tubular member 2 is secured along the curved portion of Bourdon tube 1 for movement therewith, as illustrated in the sectional view shown in FIG. 1A. It should be recognized that all of the sectional views herein illustrated are actually taken along a line perpendicular to the indicated lines A-A and B-B (i.e. along a line directed perpendicular to the sheet of the drawing as viewed by the observer. The stationary open end 5 of the Bourdon tube is in fluid communication with a sensed fluid 6. The movable closed end 7 of the Bourdon tube is located in proximity to the two ports 8 and 9 of proportional fluidic receiver 3. A nozzle 10, secured to the closed end 7 of the Bourdon tube, is in fluid communication with a source of working fluid 11 through the flexible tubular member 2. Flexible tubular member 2 is bonded or coextruded along the outside of the curved portion of the Bourdon tube in such a manner as to make it an integral part of the device while providing a minimum of mechanical resistance to the movement of the Bourdon tube. Nozzle 10 may comprise a separate mechanical element or it may be formed at the output end of tubular member 2.

Bimetallic support member 4, the movable end of which is formed into, or is bonded to, proportional fluidic receiver 3, is comprised of two metallic strips 12, 13 of rectangular cross section, having dissimilar coefficients of thermal expansion, as in best illustrated in the sectional view so shown in FIG. 1B (i.e. strip 12 is on the inside, that is, has a smaller radius of curvature than strip 13). Prior to being bonded together, strips 12 and 13 are longitudinally grooved so that when they are joined, fluid passages 14 and 15 are internally formed at their common surface, passage 15 being nearer, and 14 being further away, as viewed by the observer. These internal passages serve to convey fluid signals from ports 8 and 9 to an appropriate utilization device (e.g. a proportional-type fluidic amplifier). While the metallic strips 12 and 13 are of uniform cross section throughout substantially all the length of the bimetallic support member 4, they may be increased in thickness at the movable end of the bimetallic member in order to better accommodate the passages of proportional fluidic receiver 3.

Referring to the cutaway view of proportional fluidic receiver 3, within which planes $a$, $b$ and $c$ are at levels respectively further from the observer, it is seen that the internal passages 14 and 15 of bimetallic support member 4 are respectively in fluid communication with input ports 8 and 9. Since the internal passages 14 and 15, as they pass from bimetallic support member 4 into the area of fluidic receiver 3, lie in a plane which is orthogonal to the plane containing these passages leading from the input ports in receiver 3, it is necessary to achieve alignment between these two sets of passages by means of translating connecting passages 16 and 17. Thus, as passage 15 proceeds from bimetallic support member 4 toward input port 9, its level is changed (translated) from plane $a$ to plane $b$ via translating connecting passage 17. Similarly, as passage 14 proceeds from bimetallic support member 4 toward input port 8 its level is changed from plane $c$ to plane $b$ via translating connecting passage 16.

When the pressure of sensed fluid 6 is equal to the pressure of the ambient fluid, there is no net gas force on the Bourdon tube. Under this condition, the resilience of the Bourdon tube has no effect upon the position of the working fluid jet, and under this condition only, the working jet position is affected only by the linear temperature coefficient of expansion of the Bourdon tube which should be matched by the linear temperature coefficient of expansion of member 4. Further, for this condition the thermal coefficient of expansion of strips 12 and 13 should be equal. For any other condition where there is a net gas force on the Bourdon tube, the net gas force is balanced by the resilient spring force on the Bourdon tube, and since this resilient force decreases as temperature increases, the receiver ports 8 and 9 must be repositioned by an equal amount through the difference in the thermal coefficient of expansion of strips 12 and 13.

When the pressure of sensed fluid 6 rises above ambient pressure, the internal fluid forces exerted in the Bourdon tube tend to force its cross section into a circular configuration, thereby causing the radius of curvature of the Bourdon tube to increase slightly and the nozzle 10 to direct a proportionally larger amount of the working fluid jet into input port 8. Similarly, when the pressure of the sensed fluid 6 falls below the initial ambient pressure, the radius of curvature of the Bourdon tube decreases, proportionally causing a greater amount of working fluid to be directed into input port 9. As a result, a differential or "push-pull" pressure signal whose magnitude varies in proportion to the pressure difference between the sensed fluid 6 and the ambient fluid, is communicated from fluidic receiver 3, via internal passages 14 and 15, to the utilization device.

As was mentioned at the outset, increases in ambient temperature result in decreased Bourdon tube resilience, which is reflected in greater deflection of the Bourdon tube per unit of pressure change in sensed fluid 6. Maintaining a constant internal and external pressure upon the Bourdon tube and a constant ambient temperature obtains a constant differential pressure fluid signal at the utilization device. However, in the absence of temperature compensation, increased ambient temperature (while maintaining the same constant pressures) results in an incremental decrease in the resilience of the Bourdon tube and an associated decrease in the mechanical opposition it offers to the forces exerted by the sensed fluid 6 and ambient pressure. Accordingly, nozzle 10 would direct a proportionally greater amount of the working fluid jet into input port 8. Thus, the increase in ambient temperature would be reflected in an increase in the differential pressure signal sensed by the utilization device. In order to compensate for this temperature-related deflection of nozzle 10, a corresponding temperature-related deflection is imparted to fluidic receiver 3 by means of a properly designed bimetallic support member 4. Obviously, the bimetallic support member should be at the same temperature as the Bourdon tube whose resilience change is to be compensated. The temperature of the sensed fluid 6 need not be the same as the temperature of the Bourdon tube or receiver support member.

The theory and operation of bimetallic structures are well-known. If two metallic strips (12, 13) having identical geometries but dissimilar coefficients of thermal expansion are subjected to a uniform increase in temperature, the strip with the higher coefficient of thermal expansion will experience a greater amount of thermal growth and will thus be longer at the higher temperature than the other strip. If, at the initial temperature when the two strips are of equal length, they are bonded securely together and then subjected to an increase in temperature, the resultant combination will bend in a plane which is orthogonal to the surface common to the two strips. Since the strip 12 having the higher coefficient of thermal expansion will undergo greater thermal growth, it will be closer to the center of curvature associated with the bimetallic structure, i.e., it will be on the "inside" of the resultant curve. If the bonded combination is straight or has an initial uniform curvature, the resulting curvature on uniform temperature change is uniform, that is, a true arc of constant radius. This follows since the stresses producing the bending movement are uniform for any cross section.

Having either theoretically or empirically determined the extent to which temperature changes over a given temperature and pressure range affect the deflection of closed end 7 of the Bourdon tube, an appropriate bimetallic support member 4 may be designed which will impart to proportional fluidic receiver 3 a temperature relate deflection which is substantially equal in magnitude and direction to that portion of the Bourdon tube deflection which is due to the change in ambient temperature. It should be obvious that for a different sensed fluid pressure range of operation, different bimetallic support member 4 must be designed to obtain a temperature-independent pressure responsive transducer. It is not necessary that the bimetallic support member be at the same temperature as the sensed fluid 6, but it is necessary that it be at the same temperature as the Bourdon tube which it compensates.

In the embodiment of the invention shown in FIG. 2 first ends of two flexible tubular members 18 and 19 are placed in fluid communication with input ports 8 and 9 of proportional fluidic receiver 3a through openings 20 and 21 and internal passages 22 and 23, respectively. The two tubular members 18, 19 are bonded longitudinally along the outside of the bimetallic support member 4a in such a way as to make them an integral part of the support member while offering a minimum of mechanical resistance to its movement. The mounting of the tubular members is best illustrated by the sectional view of FIG. 2C wherein it is evident that members 18, 19 may be in the plane containing the common surface between the two strips of bimetallic support member 4a as in the case of passages 14, 15 in FIG. 1A. The opposite ends of tubular members 18 and 19 are then placed in fluid communication with the utilization device. Operation of this embodiment of the invention is identical to the operation of the embodiment shown in FIG. 1.

It will be apparent to those skilled in the art that the temperature compensated Bourdon tube fluidic transducer of the invention may employ other temperature sensitive materials, and may assume embodiments other than the preferred forms specifically set out and described above. Thus, if it is desired to produce an output signal proportional to absolute ambient pressure and substantially independent of ambient temperature, it is necessary that the Bourdon tube be evacuated resulting in the flattening of the Bourdon tube cross section as ambient pressure increases. Since the amount of flattening is increased as temperature increases, and is in a direction resulting in a decrease of the radius of curvature of the Bourdon tube, it is necessary to have the higher coefficient of thermal expansion material of the support member be on the outside of the member so that the receiver ports will be positioned (deflected) in the same direction and by the same amount as the Bourdon tube is positioned (deflected) by temperature. This change in direction of temperature compensation is necessary whenever the ambient pressure is greater than the sensed fluid 6 pressure. Also the temperature compensation taught by this invention is not limited to the high ambient temperatures above 1000° F, but also finds application in the lower temperature range below 1000° F including the cryogenic temperatures. Thus, it is intended by the appended claims to cover all such modifications of the invention which fall within the true spirit and scope of the following claims.

I claim:

1. A temperature compensated fluid-operated control device comprising:
   a pressure and temperature deflectable Bourdon tube;
   a proportional fluidic receiver;
   means for directing the flow of a fluid into said proportional fluidic receiver in response to the deflection of said Bourdon tube; and
   temperature responsive means for imparting to said proportional fluidic receiver temperature-related deflection of magnitude and direction equal to the temperature-related deflection of said Bourdon tube whereby said control device is pressure responsive and substantially temperature independent.

2. A temperature compensated fluid-operated control device comprising:
   a pressure and temperature responsive Bourdon tube surrounded by an ambient fluid and having a stationary open end and a movable closed end, said stationary open end being connected to and in fluid communication with a sensed fluid;
   a tubular member having an input end for receiving a working fluid, a flexible portion, and output end separated from said input end by said flexible portion, said output end forming said working fluid into a fluid jet as said working fluid issues from said tubular member;
   connecting means for causing the output end of said tubular member and said fluid jet issuing therefrom to move in response to motion of the movable closed end of said Bourdon tube;
   a proportional fluidic receiver having ports for intercepting said fluid jet in proportion to the relative alignment of said fluid jet with said ports; and
   a temperature-compensating bimetallic support member for imparting to said proportional fluidic receiver temperature-related deflection of magnitude and direction equal to the temperature-related deflection of said Bourdon tube whereby said device is pressure responsive and substantially temperature independent.

3. A temperature compensated fluid-operated control device as recited in claim 2 wherein the ports of said proportional fluidic receiver are in fluid communication with a utilization device by means of fluid passages internal to said bimetallic support member.

4. A temperature compensated fluid-operated control device as recited in claim 2 wherein the ports of said proportional fluidic receiver are in fluid communication with a utilization device by means of flexible tubular members.

5. A temperature compensated fluid-operated control device as recited in claim 2 wherein the ports of said proportional fluidic receiver are in fluid communication with a utilization device by means of fluid passages external of said bimetallic support member.

6. A temperature compensated fluid-operated control device as recited in claim 2 wherein; said bimetallic support member is C-shaped, a body of higher coefficient of thermal expansion material of said bimetallic support member having a smaller radius of curvature than the body of lower coefficient of thermal expansion material of said bimetallic support member; the pressure of the ambient fluid being less than the pressure of the sensed fluid.

7. A temperature compensated fluid-operated control device as recited in claim 2 wherein: said bimetallic support member is C-shaped, a body of higher coefficient of thermal expansion material of said bimetallic support member having a greater radius of curvature than the body of lower coefficient of thermal expansion material of said bimetallic support member; the pressure of the ambient fluid being greater than the pressure of the sensed fluid.

8. A temperature compensated fluid-operated transducer responsive to pressure changes in a sensed fluid comprising:
   a Bourdon pressure tube of the C-type surrounded by an ambient fluid and having a stationary open end and a movable closed end, said stationary open end connected to and in fluid communication with a pressurized sensed fluid whereby said closed end is movable in response to pressure changes in the sensed fluid, said closed end also being movable in response to temperature changes in the ambient fluid;
   a tubular member having an input end for receiving a working fluid, a flexible portion, and an output end separated from said input end by said flexible portion, said output end forming said working fluid into a fluid jet as said working fluid issues from said tubular member;
   means for connecting the output end of said tubular member to the closed end of said Bourdon tube whereby the fluid jet issuing from said tubular member moves in response to the pressure and temperature-related motion of the closed end of said Bourdon tube;
   a proportional fluidic receiver having ports for intercepting the fluid jet in proportion to the relative alignment of the jet with said ports; and
   a temperature responsive member surrounded by the ambient fluid and adapted for supporting said fluidic receiver and for imparting thereto a temperature-related deflection of magnitude and direction equal to the temperature-related deflection of the closed end of said Bourdon tube whereby said transducer is pressure responsive and substantially temperature independent over a particular range of pressures of the sensed fluid.

9. A temperature compensated fluid-operated transducer as recited in claim 8 and further comprising: fluid passage means in fluid communication with the ports of said fluidic receiver for providing fluid communication between said ports and a utilization device.

10. A temperature compensated fluid-operated transducer as recited in claim 9 wherein said temperature responsive support member comprises a bimetallic member including:
    a first metallic strip of substantially rectangular cross section;
    a second metallic strip of like substantially rectangular cross section and of dissimilar coefficient of thermal expansion from said first strip, the common surface between said first and second strips being in a plane orthogonal to the plane containing the ports of said receiver in the region thereof;

said fluid passage means in mechanical communication with said bimetallic member longitudinally thereof, a substantial length of said fluid passage means positioned in the plane containing the common surface between said first and second strips and along the lengths thereof; and said fluid passage means including relatively short translating fluid passages for interconnecting the ports of said fluid receiver with the substantial length of said fluid passage means.